US009617069B2

(12) United States Patent
Fesmire

(10) Patent No.: US 9,617,069 B2
(45) Date of Patent: Apr. 11, 2017

(54) THERMAL INSULATION SYSTEM FOR NON-VACUUM APPLICATIONS INCLUDING A MULTILAYER COMPOSITE

(71) Applicant: United States of America as Represented by the Adm, Washington, DC (US)

(72) Inventor: James E. Fesmire, Titusville, FL (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 490 days.

(21) Appl. No.: 14/203,264

(22) Filed: Mar. 10, 2014

(65) Prior Publication Data

US 2014/0255628 A1    Sep. 11, 2014

Related U.S. Application Data

(60) Provisional application No. 61/776,639, filed on Mar. 11, 2013.

(51) Int. Cl.
*B65D 90/06* (2006.01)
*F16L 59/02* (2006.01)
(Continued)

(52) U.S. Cl.
CPC ............ *B65D 90/06* (2013.01); *B32B 15/046* (2013.01); *B32B 15/20* (2013.01); *B32B 27/065* (2013.01);
(Continued)

(58) Field of Classification Search
CPC ...... B65D 90/06; B65D 90/022; F16L 59/022; F16L 59/029; F16L 59/08; F16L 59/161;
(Continued)

(56) References Cited

U.S. PATENT DOCUMENTS 3,265,236 A    8/1966 Gibbon
5,792,539 A    8/1998 Hunter
(Continued)

FOREIGN PATENT DOCUMENTS

GB           942370 A    11/1963

*Primary Examiner* — Michael C Miggins
(74) *Attorney, Agent, or Firm* — Michelle L. Ford; Jennifer P. Yancy

(57) ABSTRACT

The thermal insulation system of the present invention is for non-vacuum applications and is specifically tailored to the ambient pressure environment with any level of humidity or moisture. The thermal insulation system includes a multi-layered composite including i) at least one thermal insulation layer and at least one compressible barrier layer provided as alternating, successive layers, and ii) at least one reflective film provided on at least one surface of the thermal insulation layer and/or said compressible barrier layer. The different layers and materials and their combinations are designed to provide low effective thermal conductivity for the system by managing all modes of heat transfer. The thermal insulation system includes an optional outer casing surrounding the multilayered composite. The thermal insulation system is particularly suited for use in any sub-ambient temperature environment where moisture or its adverse effects are a concern. The thermal insulation system provides physical resilience against damaging mechanical effects including compression, flexure, impact, vibration, and thermal expansion/contraction.

40 Claims, 11 Drawing Sheets

(51) Int. Cl.
*F16L 59/08* (2006.01)
*F16L 59/16* (2006.01)
*F16L 59/18* (2006.01)
*B65D 90/02* (2006.01)
*B32B 15/04* (2006.01)
*B32B 15/20* (2006.01)
*B32B 27/06* (2006.01)

(52) U.S. Cl.
CPC .......... *B65D 90/022* (2013.01); *F16L 59/022* (2013.01); *F16L 59/029* (2013.01); *F16L 59/08* (2013.01); *F16L 59/161* (2013.01); *F16L 59/184* (2013.01); *B32B 2266/0278* (2013.01); *B32B 2307/304* (2013.01); *B32B 2307/416* (2013.01); *B32B 2307/712* (2013.01); *B32B 2307/7265* (2013.01); *Y10T 156/10* (2015.01); *Y10T 428/13* (2015.01); *Y10T 428/233* (2015.01); *Y10T 428/239* (2015.01); *Y10T 428/24999* (2015.04); *Y10T 428/31678* (2015.04)

(58) Field of Classification Search
CPC ...... F16L 59/184; B32B 15/046; B32B 15/20; B32B 27/065; B32B 2266/0278; B32B 2307/304; B32B 2307/416; B32B 2307/712; B32B 2307/7265; Y10T 428/239; Y10T 156/10; Y10T 428/13; Y10T 428/233; Y10T 428/31678; Y10T 428/24999
See application file for complete search history.

(56) References Cited

U.S. PATENT DOCUMENTS

| | | |
|---|---|---|
| 6,967,051 B1 | 11/2005 | Augustynowicz |
| 2008/0032114 A1 | 2/2008 | Squires et al. |
| 2010/0236763 A1 | 9/2010 | Torok |
| 2011/0107621 A1 | 5/2011 | Mordecai et al. |
| 2011/0283655 A1 | 11/2011 | Orologio |
| 2012/0107547 A1 | 5/2012 | Fernando et al. |

Side View

End View

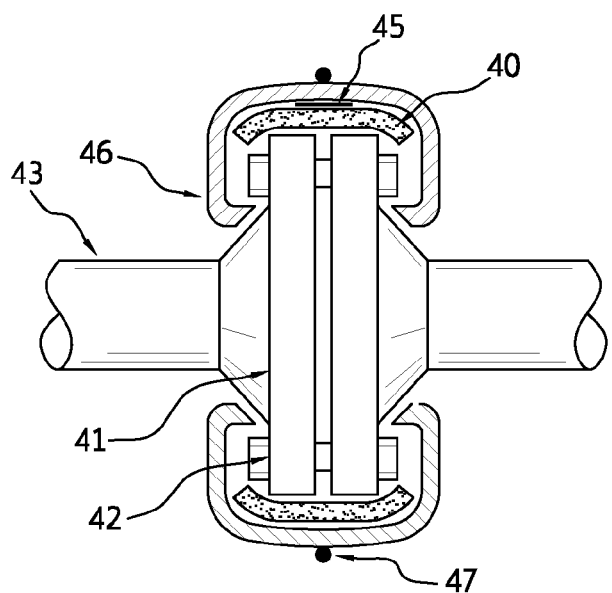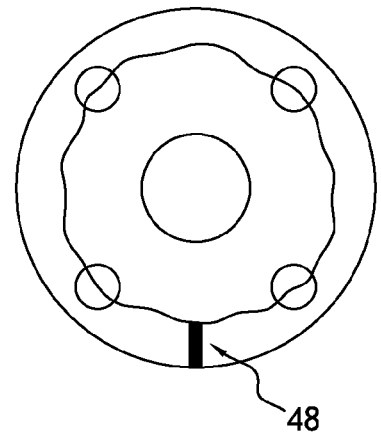
FIG. 4A  FIG. 4B
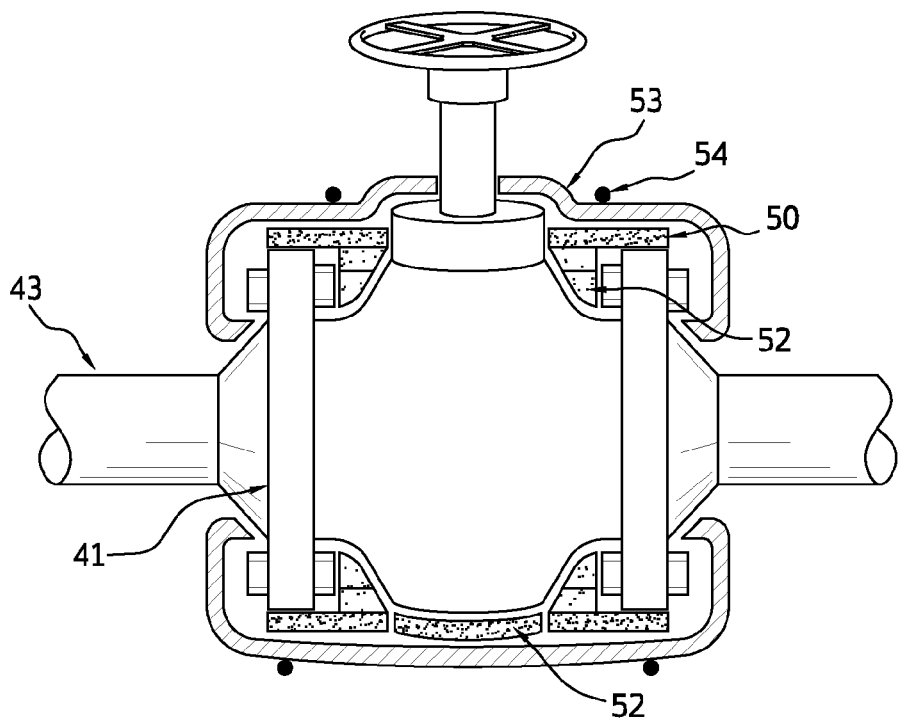
FIG. 5

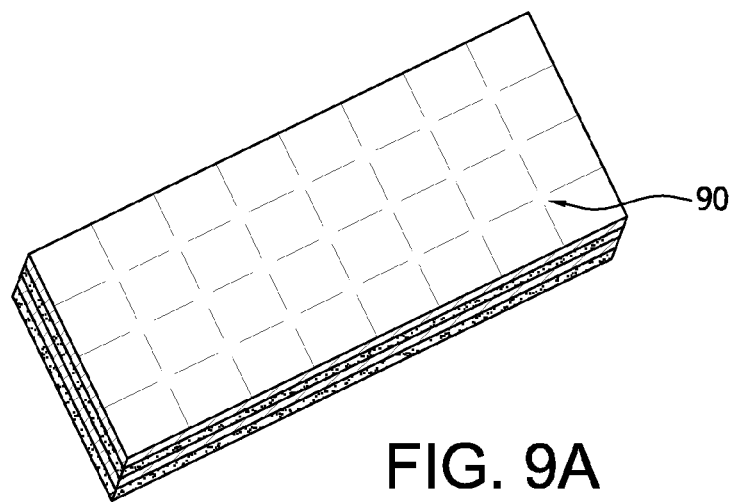
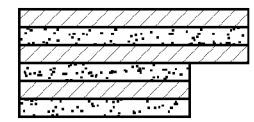
FIG. 9A
FIG. 9B
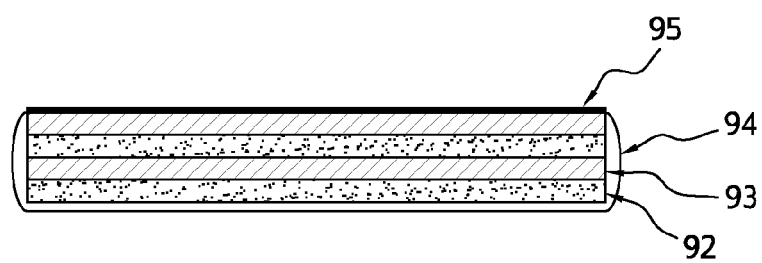
FIG. 9C
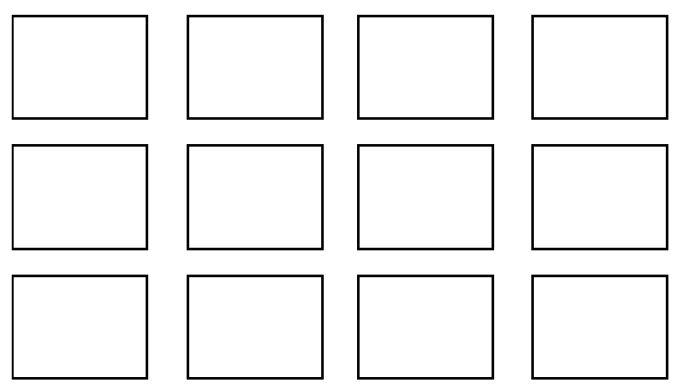
FIG. 9D

THERMAL INSULATION SYSTEM FOR NON-VACUUM APPLICATIONS INCLUDING A MULTILAYER COMPOSITE

CROSS-REFERENCE TO RELATED APPLICATIONS

This application claims the benefit, under 35 U.S.C. 119(e), of U.S. Provisional Application No. 61/776,639 filed Mar. 11, 2013, the contents of which are incorporated herein by reference.

ORIGIN OF THE INVENTION

The invention described herein was made by an employee of the United States Government and may be manufactured and used by or for the Government of the United States of America for governmental purposes without the payment of any royalties thereon or therefore.

BACKGROUND OF THE INVENTION

1. Field of the Invention

The present invention relates generally to a thermal insulation system and method of insulating in non-vacuum applications.

2. Description of Related Art

It is often necessary or desirable to limit heat transfer from an object to its surroundings. Heat transfer is the transfer of energy resulting from a temperature differential between the object and its surroundings. Heat transfer occurs through four fundamental mechanisms: radiation, solid conduction, gas conduction, and convection. The total heat transfer through any thermal insulation system will always be a combination of these four mechanisms. The dominant mechanism(s) will depend on the operational environment and the level of heat transfer.

Conduction generally involves the transfer of energy of motion between adjacent molecules, such as vibration of atoms in a crystal lattice or random motion of molecules in a gas. As such, conduction requires physical contact to affect heat transfer. The thermal conductivity, or k, is a function of the molecular state of the conducting medium. Accordingly, it is generally considered to be dependent upon temperature and pressure. Lower values of k result in a reduction in heat transfer. Heat transfer or movement of thermal energy occurs in the direction of decreasing temperature.

Convection involves the transfer of heat due to bulk transport and mixing of macroscopic elements of a fluid. Convection is thus more complicated than conduction as fluid dynamics play a significant factor in the rate of heat transfer. The heat-transfer coefficient, h, is a function of the properties of the fluid, the geometry and surface characteristics of the object surface, and the flow pattern of the fluid. Convection can by induced by density differences within the fluid medium, i.e., natural convection, or motion may be the result of external effects, i.e., forced convection. Because convective heat transfer relies on transport within a fluid medium, this component usually becomes a minor component of the total heat transfer at pressures below about 10 torr or a major component at pressures above about 100 torr.

Radiation is the transfer of heat by electromagnetic radiation, or photons. Radiation transfer is dependent upon the absorptivity, emissivity and reflectivity of the body radiating energy, i.e., the source, and the body at which the radiation impinges, i.e., the sink. There is a strong dependence of the heat-transfer coefficient on temperature as an object's radiation, and thus the heat transfer medium, will depend largely on its temperature. Although radiation transfer may occur through gases, liquids or solids, these media will absorb or reflect some or all of the energy. Accordingly, radiation transfer occurs most efficiently through an empty, vacuous space.

One common thermal insulation used in cryogenic and aerospace applications is known as Multilayer Insulation (MLI), or Superinsulation. The development of MLI around 1960 was spurred on by the space program and generally contains multiple layers of reflective material separated by spacers having low conductivity. MLI systems are intended for use in evacuated (vacuum) environments.

Ideal MLI consists of many radiation shields stacked in parallel as close as possible without touching. Low thermal conductivity spacers are employed between the layers to keep the highly conductive shields from touching one another. MLI will typically contain on the order of 50 layers per inch. MLI is thus anisotropic by nature, making it difficult to apply to complex geometries. MLI is generally very sensitive to mechanical compression and edge effects, requiring careful attention to details during all phases of installation. Accordingly, performance in practice, even under laboratory conditions, is often several times worse than ideal.

In addition, MLI is designed to work under high vacuum levels, i.e., below about $1 \times 10^{-4}$ torr. Not only does this require lengthy evacuation, purging and heating cycles to obtain such high vacuum levels for proper performance, but such systems require either dedicated pumping systems or adsorbents and chemical gettering packs to maintain their high vacuum. Furthermore, performance of MLI degrades rapidly upon loss of such high vacuum levels. For example, a slight change from $1 \times 10^{-5}$ torr to $1 \times 10^{-3}$ torr can double the heat transfer through the MLI system.

Layered Composite Insulation (LCI) systems for high vacuum or soft vacuum have also been developed. However, this technology is primarily targeted to vacuum type systems where soft vacuum (1-10 torr) systems for intermediate performance is defined or high van systems where back-up performance for the system that depends on lower vacuum is designed. Such LCI systems generally require a sealed outer envelope (i.e., vacuum jacket) for both the creation of a vacuum annular space and the protection of the materials from the environmental elements.

Another common insulation is foam insulation. Foam insulation is generally intended for ambient pressure (no vacuum) applications. Foams generally have reduced thermal conductivity given their small cell sizes and relatively low densities. Furthermore, foams inhibit convective heat transfer by limiting convection to the individual cells, fissures, or other spaces within the foam structure for sub-ambient temperature applications. Foam insulation materials for sub-ambient temperature applications are predominately closed cell (but could be about half open cell for some materials such as polyimide foams) and often include some form of vapor barrier as moisture accumulation within the spaces of the foam structure can rapidly increase the thermal conductivity through the foam system. Typical foam systems include polyurethane foam, polystyrene, polyimide foam, and cellular glass (FOAMGLAS®). Conventional non-vacuum systems for piping, for example, are cellular glass, rigid foam (polyurethane or polystyrene), or spray-on polyurethane foam. The first two require the difficult and expensive sealing of seams and butt-joints and are impractical to effectively insulate flanges, pipe supports, valves, and other obstacles. Sealing is imperfect and prone to deterioration over a short time. The spray foam is often not an option for many systems because of the complexity of the component and the foaming over of all components which prevents maintenance and adjustments to the system at large. In all three categories the common feature is environmental degradation, thermal cycle cracking, water entrapment, thermal conductivity increase, corrosion under insulation, and very costly downtimes for stripping and replacement. Added to these problems are the fragile nature of the materials which tend to get compromised or even destroyed by natural engineering mechanical loadings and normal work activities.

Foam insulation is widely used in cryogenic and other sub-ambient applications but is subject to the limitations mentioned above. Such insulation is prone to cracking due to thermal cycling and cellular degradation due to environmental exposure. Cellular degradation opens pathways for the uptake and migration of moisture due to the "vapor drive" caused by the temperature difference through the thickness of the foam insulation system. Cracks permit incursion of moisture and humid air, which will form ice and greatly increase the surface area for heat transfer. The sealing materials used tend to further trap the water inside the system; the moisture intrusion can come in one small spot even though the rest of the system remains sealed.

Other insulation systems useful in cryogenic applications include evacuated annular spaces having bulk-filled materials, e.g., glass fiber, silica aerogel or composites. As with MLI, these systems require high vacuum levels of around $1 \times 10^{-3}$ torr.

Cryogenic insulation system performance is often reported for large temperature differences in terms of an effective thermal conductivity, or k value ($k_e$). Boundary temperatures of 77K (liquid nitrogen) and 293K (room temperature) are common. Unless otherwise noted, k values discussed herein apply generally to these boundary conditions, as described by industry standard ASTM C1774.

MLI systems can produce $k_e$ of below 0.1 mW/m-K (or R-value of approximately 1440) when properly operating at cold vacuum pressure (CVP) below about $1 \times 10^{-4}$ torr. For bulk-filled insulation systems operating at CVP below about $1 \times 10^{-3}$ torr, $k_e$ of about 2 mW/m-K (R-value of approximately 72) may be typical. Foam and similar materials at ambient pressures typically may produce $k_e$ of about 30 mW/m-K (R-value of approximately 4.8). It should be noted that a $k_e$ of 1 mW/m-K is equivalent to an R-value of 144.2. R-value is a standard industry unit of thermal resistance for comparing insulating values of different materials. It is a measure of a material's resistance to heat flow in units of °F.-hr-ft$^2$/BTU-in. All values given as typical above represent one inch thickness of insulation of the type described, at ambient air pressure conditions with boundary temperatures of approximately 300K and 77K, as defined by industry technical standards including ASTM C168 and ASTM C1774.

Insulation systems are known which have low thermal conductivities at high vacuum conditions, but their performance depends on the level of vacuum and degrades precipitously as pressure is increased above $1 \times 10^{-3}$ torr. Other insulation systems are capable of operating at ambient pressure, but do not exhibit sufficiently low thermal conductivity for most cryogenic applications and are difficult to protect against moisture and air intrusion or do not hold up well in the outdoor or ambient environment. Accordingly, there is a need in the art for systems of thermal insulation having reasonably low thermal conductivity that offers consistent, stable, long-term performance in the ambient environment (e.g., weather exposure).

Ambient air, or exposed, insulation systems for low-temperature, i.e., sub-ambient, applications are difficult to achieve because of moisture ingress and environmental degradation as well as thermal stress-cracking. All currently accepted methods are fraught with problems centered around moisture and sealing. Current technology for foams and blankets are practical for installation only on "clean" free, large area surfaces that are free from complications from supports, flanges, ports, valves, structures, etc. Such "clean" systems are rarely found, leading to severe performance and life-cycle maintenance problems due to the variety of complications, imperfections, or terminations throughout the system.

The conventional wisdom and most engineering training related to thermal performance provides that if a good thermal insulation capability is required then a suitably good thermal insulation material is all that is needed. This thinking is almost always faulty, especially for sub-ambient and cryogenic applications, because of the complexity of the thermophysical processes on the surfaces of the systems exposed to the ambient environment as well as the complexity of the mechanical elements to be insulated. It is the rendered thermal insulation system that delivers the performance needed, not the specification of an individual (component) material. For example, specification of the widely used cellular glass material (FOAMGLAS®) is only the starting point as a sophisticated system of mastics, sealants, expansion joints, face sheets, and binding hardware is also required as part of its rendered, field-installed system.

BRIEF SUMMARY OF THE INVENTION

The thermal insulation system of the present invention is for non-vacuum applications. The thermal insulation system is specifically tailored to the ambient pressure environment and includes a multilayered composite. The thermal insulation system is designed to practically reduce moisture ingress, but not to try to eliminate it by glues, sealants, tapes, etc. That is, the system is a breathable design that does not require glues, sealants, tapes, etc. The multilayered composite includes at least one thermal insulation layer and at least one compressible barrier layer that are provided as alternating, successive layers for multi-functionality in design performance. Both thermal insulation and compressible barrier layers should be hydrophobic or otherwise substantially waterproof. The multilayered composite also includes at least one reflective film provided on at least one of the surfaces of the thermal insulation and/or compressible barrier layers. Specifically, the multilayered composite provides advantages in thermal performance, structural capability and mechanical operations. The thermal performance is improved by addressing all modes of heat transfer: radiation, solid conduction, gas conduction, and convection. The structural capability is enhanced by the compliance and compressibility of the two different layers of the multilayered composite working together for an easy to work with and install system. The compressible barrier layer is easily compressible by normal manual means to enable the fit-up of each respective thermal insulation layer underneath as the system is installed. This compression and conformability around the thermal insulation layer ensures excellent thermal contact which is essential in ambient pressure applications for optimum thermal performance (that is, lowest heat leakage rate or lowest overall thermal conductivity of the total system). Without this compressible barrier layer, gaps between thermal insulation layers will occur and allow additional convection heat transfer, as well as regions to harbor water or other contaminants. The mechanical operations are enhanced by the robust, non-cracking nature of the thermal insulation system. The thermal insulation system can be used for complex piping systems, for example, that are full of ports, fittings, flanges, expansion joints, supports, valves, instrumentation components, and so forth. Systems that are impossible or highly impractical to insulate with previously used technology, materials and practices can be readily insulated using the thermal insulation system of the present invention. Furthermore, large "clean" surface areas can be insulated using the thermal insulation system while providing the already discussed advantages of thermal performance and mechanical robustness to avoid cracking and moisture degradation.

The thermal insulation system is a very cost-effective and practical way to provide a high level of thermal insulation performance for a wide array of commercial and industrial products. The combination of layers in the multilayered composite provides low-cost compressible barrier layers that make this thermal insulation system the highest performance for the cost. The thermal insulation system is further cost effective for life cycle costs and reliability in avoiding the numerous and severe problems of moisture intrusion and corrosion that are common to all sub-ambient temperature insulation systems operating in the ambient (e.g., humidity and rain) environment. The thermal insulation system is designed to allow for any accumulated internal water to be naturally drained and released over time according to normal thermal cycling operational processes. The approach is to reasonably limit the ingress of water and water vapor by practical means, but no intent to eliminate such ingress. The thermal insulation system, therefore, is opposite to conventional sub-ambient thermal insulation systems in that it is a breathable one. The system includes vented seams/ends and/or slits/holes and other practical means for water vapor exhaust or water draining according to the operational thermal cycles. The thermal insulation system has a long life expectancy because all layers are hydrophobic or otherwise waterproof.

Mechanically, the thermal insulation system is incredibly robust to withstand impact and vibration, as well as stresses induced by thermal expansion and contraction. The system maintains thermal insulation effectiveness while standing up to abuse in the field due to workers' access, tools, heavy equipment, etc. The thermal insulation system can additionally serve as part of piping supports and other structures. Conventional insulation systems are notoriously difficult to manage around pipe supports due to the cracking and damage that can occur. The thermal insulation system of the present invention offers good mechanical strength for supporting system loads and offering structural integrity under compressive loads of more than 100 kPa (15 psi) and up to approximately 180 kPa (26 psi). The thermal insulation system of the present invention can be substantially compressed to more than 50% of its thickness, and up to approximately 75%, with full elastic recovery when the load is removed. Used alone or inside another structure or panel, it can provide acoustic or vibration damping as a dual function with the thermal insulating benefits. The multilayered composite can be modified, cut or trimmed as desired without degradation in mechanical performance.

The thermal insulation system provides a means for easily managing external weathering conditions or even extreme weather conditions over a long life cycle. This capability sets the system apart from practically every other thermal insulation system that is currently used for sub-ambient to cryogenic temperature applications. The present thermal insulation system does not need to be perfectly sealed to handle rain, moisture accumulation, or condensation due to vapor drive. In fact, the present thermal insulation systems are designed to be breathable and strategically drain water. This long-term (estimated 25 years plus) weathering resistance is enabled by the thermal and mechanical properties of the constituent material that make-up the multilayered composite, the manner in which they are layered, and the method by which they are installed as a total thermal insulation system.

The present thermal insulation system is relatively simple and easy to install. Because the thermal insulation system is not required to be fully sealed from the weather, which is a practical impossibility for much more than a year or two with other mechanical insulation systems, the cost of installation is less. In one embodiment, only a minimal amount of wire, tape, or adhesive are used and these materials are only needed for ensuring an orderly stack-up of layers and as "helping hands" in the installation process. The materials in the present thermal insulation system are generally removable, reusable, and recyclable, a feature that is not possible with other systems. This feature enables the design of the thermal insulation system as removable insulation covers for valves, flanges, and other components for servicing or inspection. The industry of transport and distribution of liquefied natural gas (LNG), for example, has called for the specification of removable insulation covers for cryogenic valves, but to date there are no known solutions other than the present thermal insulation system.

The performance levels in terms of heat flux or effective thermal conductivity ($k_e$) are equivalent or superior to the best polyurethane foam systems but are more cost-effective and easier to use. Polyurethane foam systems are known to suffer significant and progressive degradation in performance due to aging during the first two years of operation. When subjected to environmental exposure or cracking due to thermal stresses, these polyurethane foams systems can further suffer serious degradation in performance. The built in springiness, or compressibility properties, of the multilayered composite used in the present thermal insulation system allows for simpler installation and more important, a more effective thermal insulation system due to its better consistency and full contact with the cold surface (or hot surface for high temperature applications). It is this better contact with the cold surface (or hot surface) and better closure of gaps and seams that make the thermal insulation system approach of the present invention at least as equally effective as the performance of aerogel systems in actual installed systems, but for much less cost in material and labor. Eliminating the requirement for glues, sealants, mastics, expansion joints, and vapor barriers provides dramatic savings in material and labor costs of the installed system.

BRIEF DESCRIPTION OF THE DRAWINGS

The features and advantages of the present invention will become apparent from the following detailed description of a preferred embodiment thereof, taken in conjunction with the accompanying drawings, in which:

FIG. 4A shows an embodiment of the present invention used to insulate a flange;

FIG. 4B is an end view of the embodiment provided in FIG. 4A;

FIG. 5 shows an embodiment of the present invention used to insulate a valve;

FIGS. 9A-9G show an embodiment of the present invention wherein the multilayered composite is provided as a panel for construction;

DETAILED DESCRIPTION OF THE INVENTION

Figure 1:
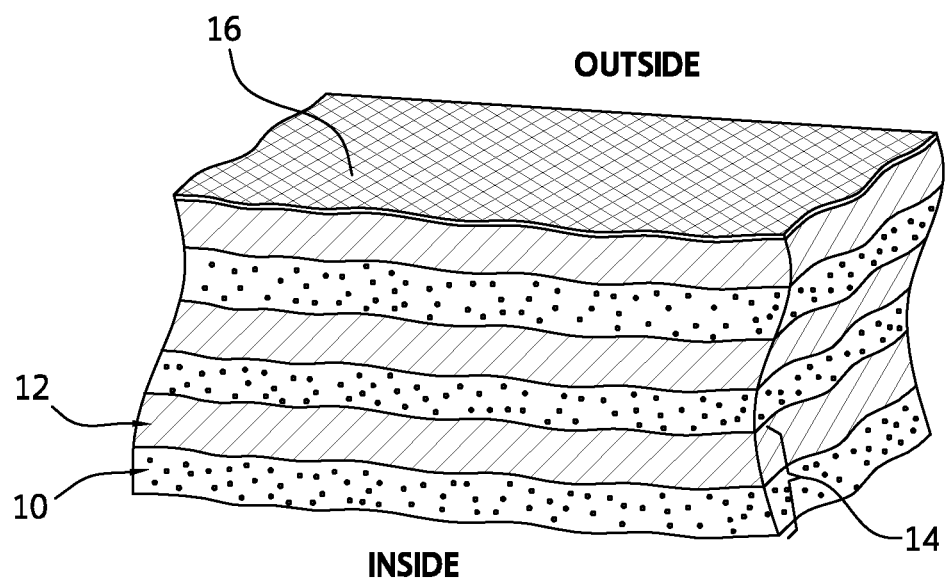
FIG. 1 shows a thermal insulation system in accordance with one embodiment of the present invention.

The present thermal insulation system is an externally applied system for non-vacuum applications which comprises a) a multilayered composite having an inner surface and an outer surface and b) an optional outer casing surrounding the outer surface of the multilayered composite. As provided in FIG. 1, the multilayered composite includes i) at least one thermal insulation layer 10 and at least one compressible barrier layer 12 provided as alternating, successive layers and ii) at least one reflective film provided on at least one surface of said compressible barrier layer and/or thermal insulation layer. Both thermal insulation layer(s) and compressible barrier layer(s) are conformable to a three-dimensional surface of an article to be insulated. The thermal insulation layer 10 is always disposed directly adjacent to the surface of the article to be insulated. The reflective film is formed of a material selected from a group consisting of metal foils and metalized foils. In one embodiment, the multilayered composite includes at least one compressible barrier layer 12 that is directed disposed on the at least one thermal insulation layer 10 forming a layer pair 14 without any additional intervening layer other than at least one reflective film provided on at least one of the surfaces of the compressible barrier layer and/or thermal insulation layer. In another preferred embodiment, the multilayered composite may include a plurality of thermal insulation layers that successively alternate with a plurality of compressible barrier layers provided that such layers include at least one reflective film provided on at least one of the surfaces of the compressible barrier layer(s) and/or thermal insulation layer(s) and are directly disposed upon each other without any additional intervening layers. In one embodiment, the thermal insulation layer(s) and/or compressible barrier layer(s) may optionally include a reflective film on one or both sides. In an embodiment wherein the thermal insulation layer includes a reflective film and is provided as the inner surface of the multilayered composite, the reflective film is on the side of the thermal insulation layer not in direct contact with the surface of the article to be insulated. The outer surface of the multilayered composite may be composed of either a thermal insulation layer or a compressible barrier layer depending on the thermal insulation requirements desired. The number of thermal insulation layers employed in the thermal insulation system may typically be in the range of approximately 2 to 10, although the number of thermal insulation layers is dependent upon the desired insulation characteristics or other external constraints, such as cost or space (total thickness) considerations. Other typical installations may contain approximately 10 to 50 thermal insulation layers. Additional thermal insulation layers will tend to lower the heat flux through the thermal insulation system, but generally the marginal improvement at some point will not justify the additional cost. Optionally, the thermal insulation system may include an outer casing 16 provided against the outer surface of the multilayered composite.

In yet another preferred embodiment, the thermal insulation system is used for non-vacuum applications consisting of: a) a multilayered composite having an inner surface and an outer surface, wherein the multilayered composite consists of at least one thermal insulation layer and at least one compressible barrier layer provided as alternating, successive layers, and wherein the at least one thermal insulation layer and the at least one compressible barrier layer are conformable to three-dimensional surfaces of an object to be insulated; b) at least one reflective film provided on at least one surface of said at least one thermal insulation layer and/or said at least one compressible barrier layer; and c) an optional outer casing provided against the outer surface of the multilayered composite. The thermal insulation layers and/or the compressible barrier layers may optionally include a reflective film on one or both sides formed of a material selected from a group consisting of metal foils and metalized foils. The inner surface of the multilayer composite is a thermal insulation layer directly disposed against the surface of the article to be insulated.

"Conformable" is generally defined as sufficiently workable in the fitting or wrapping process to reduce the amount of internal gaps and voids between the inner thermal insulation layer and the surface of the article to be insulated and between the compressible barrier layers and thermal insulation layers. Preferably, the thermal insulation layers and compressible barrier layers are provided as blankets or flexible films.

The thermal insulation system is a "mechanical insulation" that may be applied to a variety of articles to be insulated including, but not limited to, tanks, pipes, valves, and flanges. A vacuum jacket or double wall structure is not required for the thermal insulation system and the operating environment is ambient pressure, i.e. no vacuum. The thermal insulation system may be used for sub-ambient temperature to moderately elevated temperature application. For example, the thermal insulation system may be used to insulate articles having a temperature range of from approximately 77K (−321° F.) to 373K (212° F.). Applications in this temperature range include liquid nitrogen, liquid oxygen, liquefied natural gas, liquid carbon dioxide, refrigerants, chilled water, and hot water. The thermal insulation system may include thermal insulation layer(s) and/or compressible barrier layer(s) that can be tailored for lower cryogenic temperatures to include liquid helium [4K (−452° F.)] or liquid hydrogen [20K (−423° F.)] or tailored upward to include process systems such as those having high pressure steam (500K [450° F.]).

Figure 2:
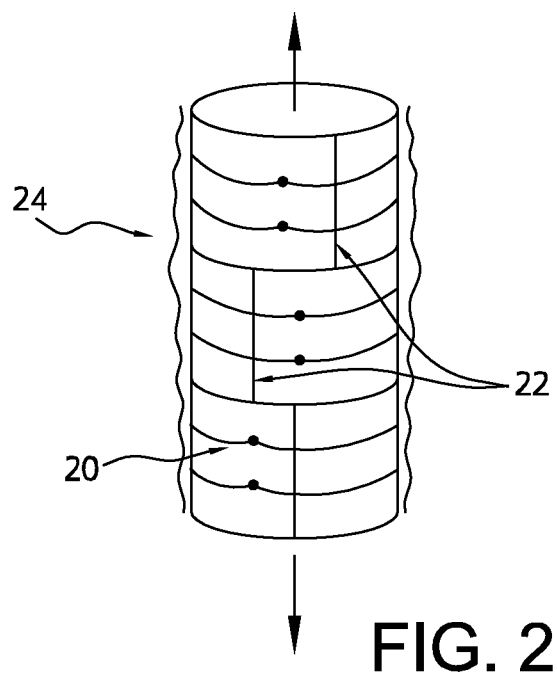
FIG. 2 shows one embodiment of the present invention wherein the thermal insulation system is applied to a tank.

FIG. 2 shows one embodiment of the present invention wherein the thermal insulation system is applied to a tank. In this embodiment, stainless steel lockwire 20 may be used to secure the thermal insulation system to the tank. Additionally, periodic pieces of tape or similar devices are options to hold individual layers of the thermal insulation system in place during the installation process. Optionally, spot areas of spray adhesive can also be helpful as a means for getting a new layer started or when working on a bottom surface. Only a minimal amount of tape, wire or adhesive is used and only for facilitating the installation process. Sealing of the seams is not required and can even work against the overall breathability and water drainage of the thermal insulation system. For horizontal piping, longitudinal seams are preferably placed near the bottom position (180 degrees) and alternated (staggered) between layers by approximately +/−10 degrees to allow drainage but prevent any open path (through crack) for heat leakage. For tanks or vertical piping, drain paths are provided at the bottom of the thermal insulation system for drainage. These paths could be around a nozzle penetration, legs, or other protuberances. As part of the installation procedure, one or more series of drain slits or holes should be added to the stack-up at the low points of the piping/tanks system. Furthermore, the multilayered composite is provided such that butt layers are arranged as staggered seams 22 so that there is preferably no overlap of adjacent layers. Seams are butt joints, but the fit-up is not critical and the joints do not have to be taped or sealed. Each individual layer is butt joined about its circumference with no overlap. Stagger joints between layers or layer pairs are as per normally accepted industry procedure. If using layer pairs, the joint between the thermal insulation layer and compressible barrier layers will include an offset such as 25-50 mm. The thermal insulation layer(s) and compressible barrier layer(s) may be provided as pre-fabricated material, layer-by-layer material, as a layer pair, or any combination thereof. The mechanical combination of these layer pairs, and further stack-up of layer pairs, provides a balance of compressibility and conformability along with dimensional stability and good fit-up. Working with the layer pair product largely mitigates the nuisance dust associated with the handling of the thermal insulation layer. In this embodiment, the thermal insulation system operates in an ambient pressure environment that is external to the article to be insulated and is capable of withstanding extreme weather conditions. The thermal insulation system is preferably hydrophobic, waterproof, vapor-proof, and UV resistant. But, moisture condensate inside, between the layers, or rain from the outside that makes it inside is guided and transported between the layers and drained or breathed out through the ends or at strategic cuts, slits, or holes in the outer casing. The lateral breathability of the thermal insulation system is tailored according to the geometric configuration and operating requirements by using additional pinholes, slits, or punches. Using gravity in the most favorable way for water drainage is enabled by the proper installation of the thermal insulation system. This embodiment also provides the optional, outer casing 24 for aesthetic purposes and additional protection as desired.

Figure 3A:
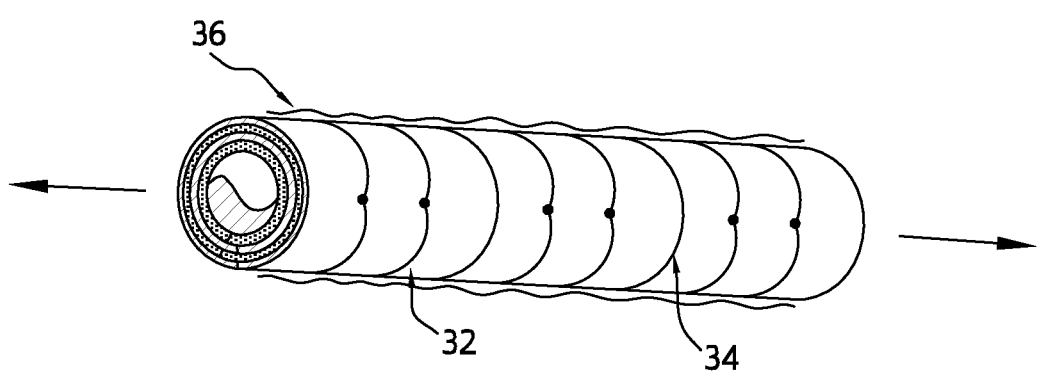
FIG. 3A shows one embodiment of the present invention wherein the thermal insulation system is provided in the form of removable insulating covers.
Figure 3B:
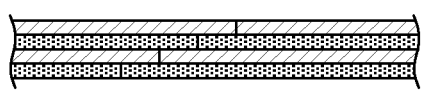
FIG. 3B shows a side view of the embodiment provided in FIG. 3A.
Figure 3C:
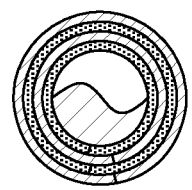
FIG. 3C shows an end view of the embodiment provided in FIG. 3A.

FIG. 3A shows one embodiment of the present invention wherein the thermal insulation system is applied to a piping system. In this embodiment the multilayered composite is provided as a layer pair secured to the piping with stainless steel lockwire 32 (or tape, straps, or adhesive). Each layer pair is butt jointed 34 about its circumference with no overlap. The level of securing depends on the desired level or permanency or removability of the installation. Stainless steel lock wire is inexpensive and works well for a multitude of uses: semi-permanent to periodic removals (such as for annual maintenance or flange re-torquing). Again, longitudinal seams are preferably provided at the bottom or near the bottom for proper water drainage. This embodiment also shows the optional outer casing 36. FIG. 3B shows a side view of the embodiment provided in FIG. 3A. In this side view, the longitudinal seams are provided on the bottom with a slight off-set. FIG. 3C shows an end view of the embodiment provided in FIG. 3A. In this end view, the butt joints are provided between segments with an off-set. In one embodiment, it is preferred that the outer surface of the multilayered composite is a conformable thin sheet material, such as aluminum, to provide good conformability to the irregular surfaces during installation. This thin sheet of metal can also be provided by the outer surface of the compressible barrier layer. Drain slits or holes may be cut into any low points in the thermal insulation system that are not taken care of by the bottom oriented butt joints. For valves with extended stems/bonnets, the upper surface is bisected halfway through to allow for installation around the valve stem, and taped and cut on each layer with a suitable aluminum or plastic tape.

FIG. 4A shows an embodiment of the present invention used to insulate a flange. In this preferred embodiment, the thermal insulation system is provided as a removable and reusable insulating cover. The multilayered composite includes a thermal insulation layer 40 directly disposed against the flange 41 and nut/bolt 42 of the pipe 43. Optionally a small amount of adhesive 45, velcro, or other suitable fastening mechanism at the top point, secures the compressible barrier layer 46 to the thermal insulation layer 40 for ease of installation. The entire thermal insulation system may be secured in place using a single, circumferential stainless steel lockwire 47 or other suitable fastening mechanism (e.g., velcro or tape) as needed for the specific operational requirements. In a preferred embodiment, one or more pre-fabricated layer pairs may be used to form the thermal insulation system. Each layer pair is preferably wrapped around the flange, positioning the seam at the bottom with no overlap. In this embodiment, a conformable radiant barrier layer 46 is folded and tucked over and underneath the flange bolts/nuts 42. FIG. 4B is an end view of the embodiment provided in FIG. 4A such that the butt joint 48 is provided at the bottom for water drainage.

FIG. 5 shows an embodiment of the present invention used to insulate a valve. The thermal insulation layer 50 is provided against the valve body with the addition of an optional insulation fill/stuffing 52 made from similar material as the insulation layer 50. The compressible barrier layer 53 is provided over the thermal insulation layer 50 and secured using stainless steel lockwire 54. A slit may be provided at the top on one side for installation. The seam is provided at the bottom for water drainage.

Figure 6A:
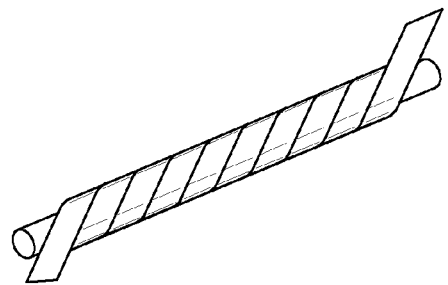
FIG. 6A shows an embodiment of the present invention provided as a spiral wrap.
Figure 6B:
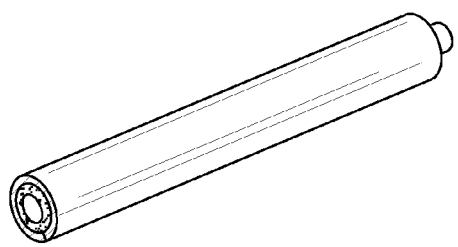
FIG. 6B shows an embodiment of the present invention provided as a longitudinal wrap.
Figure 7A:
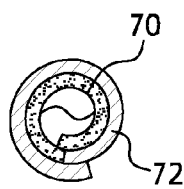
FIG. 7A shows an embodiment of the present invention provided as a layer pair applied with a partial overlap.
Figure 7B:
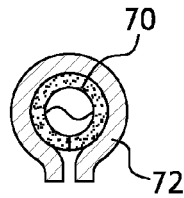
FIG. 7B shows an embodiment of the present invention provided as a layer pair applied in a face-to-face manner.
Figure 8A:
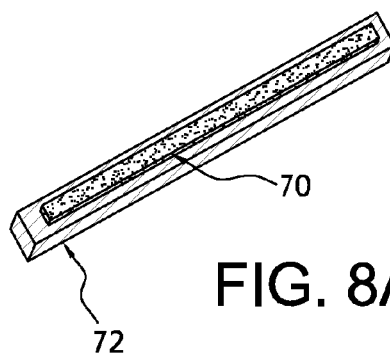
FIG. 8A shows an elevated perspective view of the layer pair in accordance with one embodiment of the present invention.
Figure 8B:
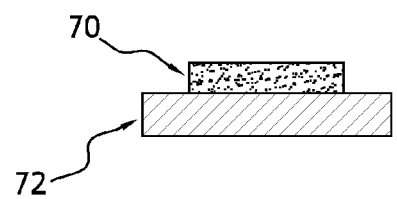
FIG. 8B shows an end view of the layer pair in accordance with one embodiment of the present invention.
Figure 8C:
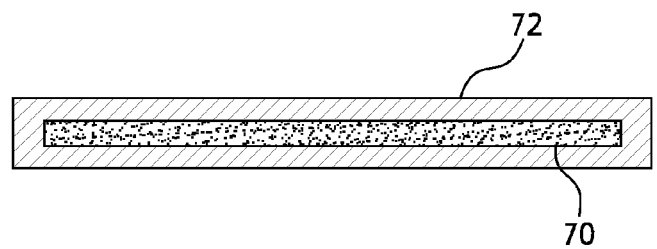
FIG. 8C shows a top view of the layer pair in accordance with one embodiment of the present invention.

FIGS. 6A-8C shows an embodiment of the present thermal insulation system intended for the use of insulating smaller piping and components. This embodiment is provided as a layer pair such that directly disposed against each other are the thermal insulation layer 70 and compressible barrier layer 72 including the reflective film on at least one surface of either the thermal insulation layer and/or compressible barrier layer. In this embodiment no additional layers of material are present except for possible adhesive materials or securing devices. The thermal insulation layer and compressible barrier layer, including the reflective film, may be tagged or fixed together by any known means, including adhesive, tape or staples. Optionally, the layer pair has a thin plastic material enclosing the exposed surface of the thermal insulation layer (not shown). FIG. 6A shows the embodiment provided as a spiral wrap. FIG. 6B shows the embodiment provided as a longitudinal wrap. The layer pair may be applied with a partial overlap as shown in FIG. 7A. Alternatively, the layer pair may be applied in a face-to-face manner as provided in FIG. 7B. It is preferable to minimize the gaps; although some gaps are expected and will not hinder the function of the thermal insulation system. FIG. 8A shows an elevated perspective view of the layer pair embodiment of the present thermal insulation system. FIG. 8B shows an end view of the layer pair wherein the thermal insulation layer 70 does not completely cover the entire surface of the compressible barrier layer 72. For example, there may be a one inch off-set of the thermal insulation layer 70 from the edges of the compressible barrier layer 72. A resilient, stretchable plastic film or tape can be added over the outermost surface of the layer pair as a final step for aesthetic purposes and to ensure that any insulation material dust is avoided. FIG. 8C shows an inside top view of the layer pair.

Figure 9E:
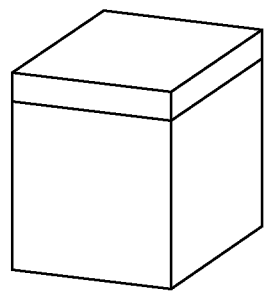

FIGS. 9A-9G show an embodiment of the present invention wherein the multilayered composite is provided as a panel for construction. FIG. 9A shows an elevated perspective view of such a panel including markings 90 for cutting guides. In one embodiment, the standard size for the panels may be, for example, 4 feet by 8 feet, or 5 feet by 10 feet. The standard thicknesses in this embodiment may be, for example, 1 inch and 2 inches. Color coding of the panel according to the application (cold work or hot work) could be employed along with a grid of cut line markings on the back. FIG. 9B shows a side view of one embodiment of the present invention including optional staggered joint design. FIG. 9C shows a side view of the panel including a thermal insulation layer 92, a compressible barrier layer 93, an optional plastic bag containment 94, and an optional outer face sheet 95. FIG. 9D shows a pre-fabricated panel cut into custom-size pieces for a given application. The plastic bag containment may be provided to minimize the nuisance dust during handling and installation and envelops the insulation material. During installation or pre-fabrication work that involves cutting, an adhesive coating or spray adhesive applied to the cuts is optionally used to minimize nuisance dust from the thermal insulation material. The panels may optionally include, or are integrated with, a face sheet of thin metal or plastic to provide improved strength, impact resistance, or other mechanical property.

Figure 9F:
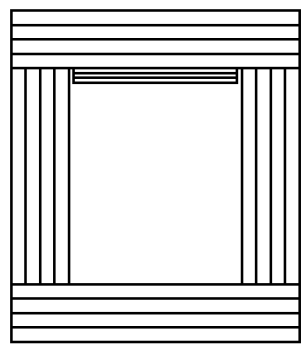
Figure 9G:
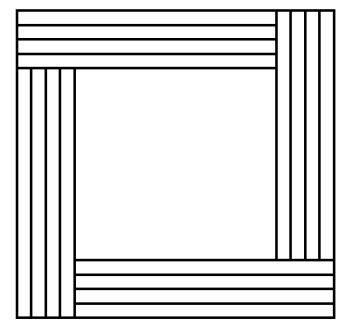

FIG. 9E-9G show a shipping box in accordance with one embodiment of the present invention wherein the thermal insulation system forms the walls of the shipping box. The panels can be pre-compressed installed within a pre-constructed cavity to provide structural elements in building walls, refrigerated shipping boxes, ISO containers, or other constructions. Panels can be cut into smaller shapes and sizes for the fabrication of shipping containers for pharmaceuticals and other temperature sensitive goods. Standardized shapes and sizes will allow for maximum reusability and recycling. FIG. 9F shows a side view of the shipping container in accordance with one embodiment of the present invention. FIG. 9G shows a top view of the shipping container in accordance with one embodiment of the present invention wherein joint design is provided to minimize heat leak.

Figure 10:
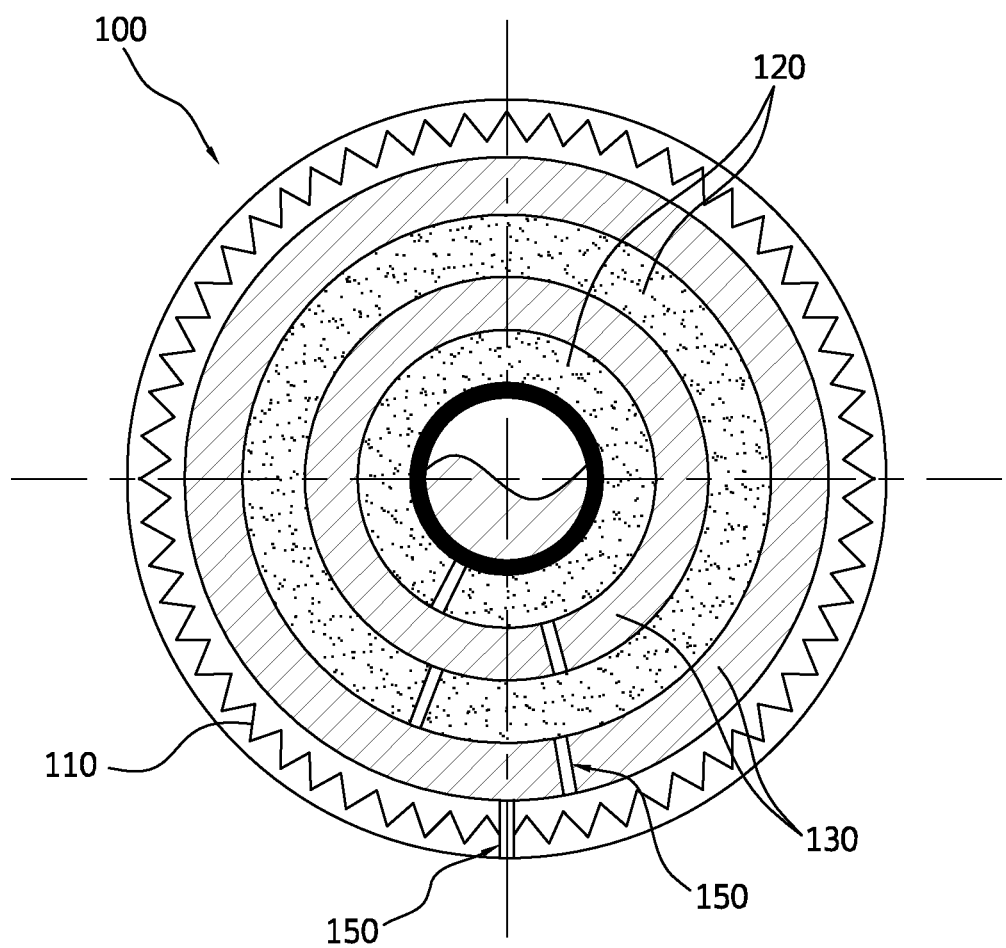
FIG. 10 shows a typical end view of the thermal insulation system in accordance with one embodiment of the present invention.
Figure 11:
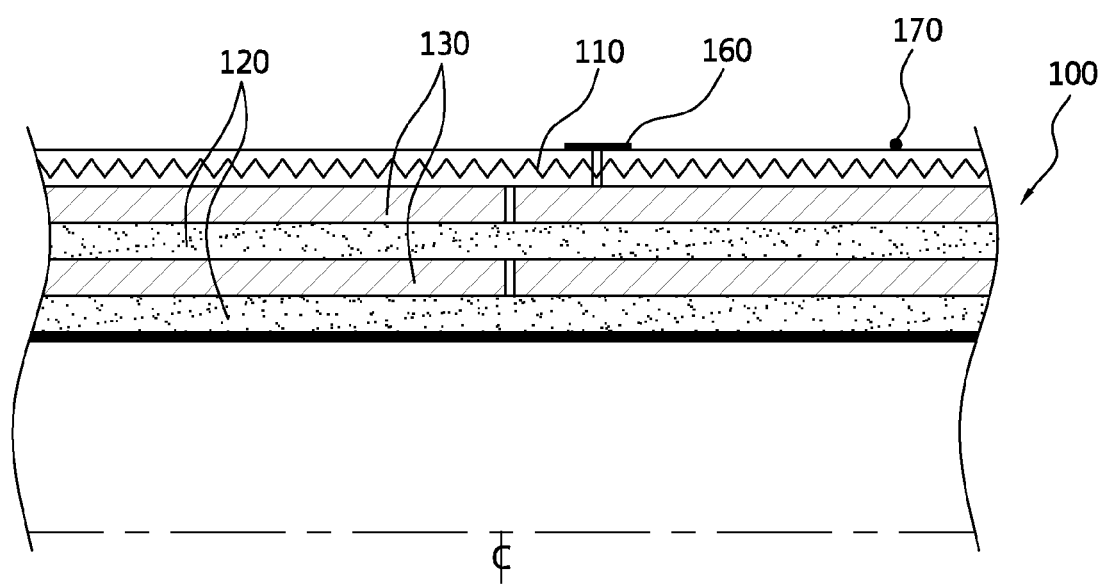
FIG. 11 shows a typical side view of the thermal insulation system in accordance with one embodiment of the present invention.

With reference to FIG. 10, one embodiment of the invention includes a thermal insulation system 100 including a multilayered composite comprising two thermal insulation layer 120 and three compressible barrier layers 110 and 130 provided as alternating, successive layers. Outer compressible barrier layer 110 includes at least one reflective film provided on at least one surface of said outer barrier layer 110. The multilayered composite has an inner surface and an outer surface wherein the inner surface is formed from at least one thermal insulation layer 120 directly disposed against a surface of an article to be insulated. In the embodiment provided in FIG. 10, the outer surface of the multilayered composite includes the outer barrier layer 110 having at least one reflective film provided on one or both outer surfaces of said outer barrier layer 110. As shown in FIG. 10, the thermal insulation system 100 preferably includes layers with butt joints 150 that are staggered in relationship to each other. FIG. 11 is a side view of FIG. 10 showing an alternate stagger joint pattern for the longitudinal direction. These joints are not required to be sealed up and moderate gaps are acceptable, making installation more simple. Lack of precision will not substantially degrade the thermal performance of the total installed system. For the outer barrier layer 110, the circumferential seams can be optionally closed with a suitable weather-resistant tape 160. A circumferentially applied stainless steel lockwire 170 can be optionally used on the outermost surface, as shown in FIG. 11, or on any layer as needed to aid the installation process.

Figure 12:
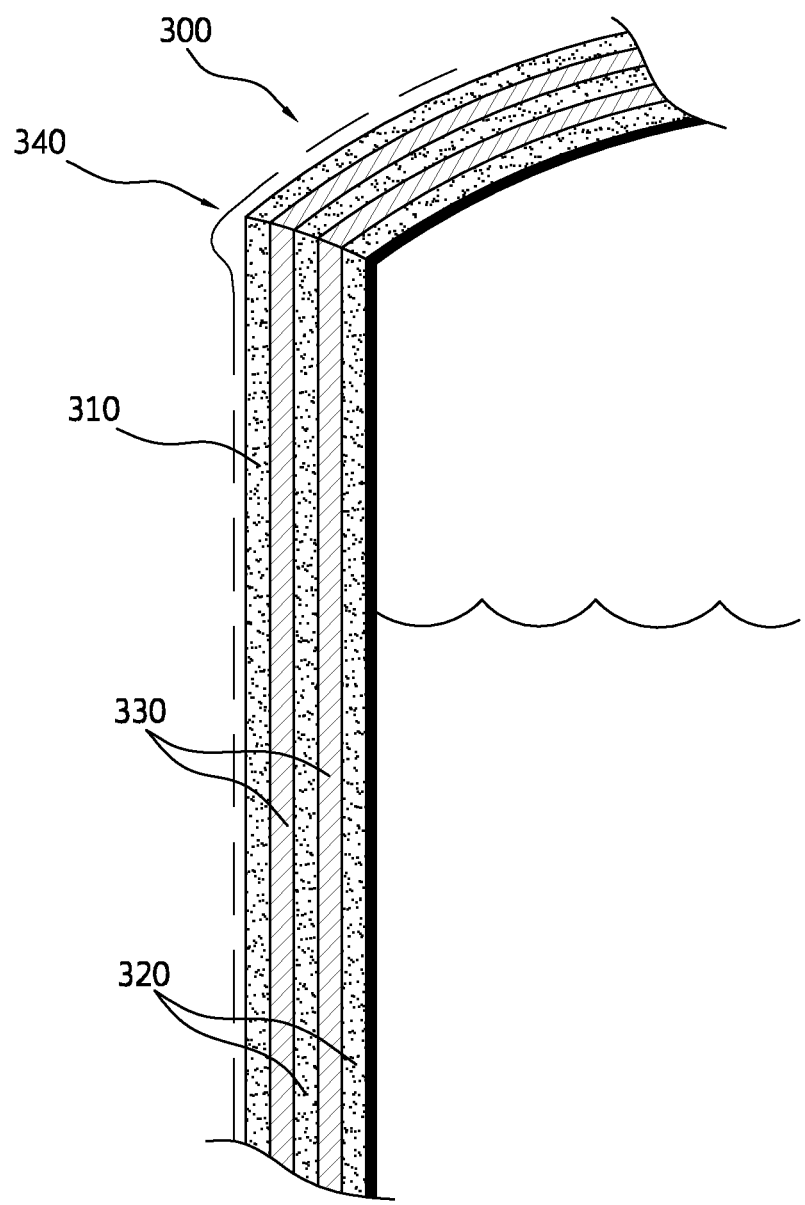
FIG. 12 shows a typical top, close-up side view of a tank with the thermal insulation system in accordance with one embodiment of the present invention.

FIG. 12 is another embodiment of the thermal insulation system 300 including a multilayered composite comprising three thermal insulation layers 310 and 320 and two compressible barrier layer 330 provided as alternating, successive layers. Outer thermal insulation layer 310 includes at least one reflective film provided on at least one surface of said outer thermal insulation layer 310. Again, this embodiment provides a multilayered composite having multiple thermal insulation layers 320 and compressible barrier layers 330 provided in successive alternating pattern such that each layer 320, 330 are directly disposed upon each other with no intervening layers other than the reflective film. This embodiment provides an outer thermal insulation layer 310 having a reflective film provided as a metal film or metalized foil. Furthermore, this embodiment provides an optional outer casing 340 surrounding the outer insulation layer 310. Each compressible barrier layer may include one or two reflective films. Each thermal insulation layer may also include one or two reflective layers. In most embodiments there will be one reflective film between each successive pair of thermal insulation layer and compressible barrier layer.

The multilayer composite, including the thermal insulation layer(s) and compressible barrier layer(s), with or without any reflective films, are flexible such that thermal insulation systems containing such layers may be applied and conformed to three-dimensional surfaces of objects to be insulated, or preformed into a variety of formats to simplify installation. Stiffeners may be added to one or more compressible barrier layers and/or thermal insulation layers of the thermal insulation system to provide rigidity as desired for making structural panels, sleeves or other elements, but the flexibility and compressibility of the compressible barrier layers and/or thermal insulation layers is determined based only on the reflective film(s) and multilayer composite including the thermal insulation layers and compressible barrier layer.

Reflective films include metal foils or metalized films provided on one or both sides of the thermal insulation layers and/or compressible barrier layers. Examples include aluminum foil, gold foil, and aluminized or double aluminized Mylar® film (Mylar® is a trademark of E.I. Du Pont De Nemours and Company, Delaware, USA, for polyester films). Such foils or films may have one surface having a lower reflectivity than the other surface. The surface having the lower reflectivity will be termed the dull surface. Reflective films will typically have a thickness of approximately ¼ to 10 mils. Thickness values of ¼ to 1 mil are common for metalized films while values of 1 to 10 mils are common for metal foils. While greater thickness may be utilized, it is generally preferred to minimize the thickness, weight, and cost of reflective films given its relatively high thermal conductivity compared to other component layers. In the embodiment provided in FIG. 10, a metalized reflective film is provided on both surfaces of each compressible barrier layer 130 and the outer compressible barrier layer 110 includes a metalized reflective film on its inner surface and a metal foil reflective film on its outer surface.

The thermal insulation layer preferably includes thermal insulation material that is hydrophobic such as an aerogel composite blanket (commercially available from Aspen Aerogels, Inc., Cabot Corp., or others). In an alternate embodiment, the thermal insulation material may be any suitable flexible thermal insulation material such as a polymeric foam. Any suitable polymeric foam, whether predominately closed cell or substantially open cell, is acceptable as long as the material is not generally damaged by water. During use, the thermal insulation layer is preferably directly disposed on the cold or hot surface of the tank, piping, or other process article. One of more layers of thermal insulation material may be applied to comprise the first thermal insulation layer as per heat leak design requirements. The thermal insulation layer may be fastened to the surface of the article to be insulated using wires, fasteners, and/or adhesive as required for convenience and good compression to the surface of the article to be insulated.

The compressible barrier layer preferably includes compressible barrier material. While the compressible barrier layer has good thermal insulating properties (in the range of 30 mW/m-K to 35 mW/m-K, for example), it is primarily selected to offer the mechanical compliance, compressibility, and placement to enable a good fit of the thermal insulation layer with optimal and convenient closure of seams and gaps. The compressible barrier material is preferably a polymeric sealed air material, commonly referred to as radiant barrier or bubble wrap, such as produced by Reflectix® or others. The compressible barrier layer can include single bubble or double bubble construction with a reflective film on one or both sides. The trapped air gaps between all layers of the total installed thermal insulation system further promote the thermal insulating effectiveness of the multilayer approach.

The thermal insulation system may include an optional outer casing that surrounds the outer surface of the multilayered composite and is preferably a breathable medium having a sufficiently low pore size to permit removal of gases and moisture within the outer casing. Optionally, the outer casing may be an impermeable medium such as a metal foil or plastic sheet including cut slits or holes to permit venting of gases and moisture from within the thermal insulation system.

FIG. 12 shows an optional outer casing 340 formed from one layer of material having one seam. However, there is no requirement that the outer casing be formed of one layer of material nor that the seam is provided in any specification location. However, minimization of the number of seams is preferred. The purpose of the optional outer casing is to provide additional compression and fit up of all layers, general protection against the outdoor elements (if applicable), and to offer additional mechanical ruggedness (if needed). Further benefits could be to provide an additional scattering of the incident radiation heat transfer from the environment.

Thermal insulation systems in accordance with the present invention may be used to insulate any article (cold or hot). Thermal insulation systems in accordance with the present invention are particularly suited to sub-ambient temperature applications including refrigeration, chilled water, buildings, and cryogenic systems. In such installations, thermal insulation systems of the present invention should be applied with the thermal insulation layer of the multilayer composite facing the colder side, e.g., a storage tank for liquid nitrogen, liquefied natural gas, or liquid carbon dioxide. Some specific examples of commercial low-temperature applications include the insulation of superconducting power transmission cables and equipment; storage, transfer and transportation systems for liquid cryogens; space launch vehicle propellant tanks and feed lines; industrial refrigeration units; and other thermal storage devices. Additional examples include construction, food processing, medical equipment, manufacturing, and other cryogenic applications. Non-cryogenic applications include systems for the use, transfer, and transportation of carbon dioxide, ammonia, chilled water or brine, oil, and steam, as well as other applications for medium-high temperature gases, vapors, or liquids.

The types and placements of seams, joints, gaps, and vent holes are a key part of the present invention. The installation philosophy, in general, includes an over-arching point of providing a pathway for any accumulated water to drain out or naturally aspirate with the normal operational thermal cycling. The thermal insulation system may be used for both cryogenic tank and cryogenic piping systems with complex mechanical features or for refrigerated transport, buildings, or HVAC systems. The careful sealing up of seams and joints, common to conventional thermal insulation systems for cold systems in the ambient environment, is not required in the thermal insulation system of the present invention, thus saving on the cost of materials and labor and making the system removable and reusable.

The following Examples are used to illustrate the beneficial results that are obtained using the present thermal insulation system. However, it should be understood by one of ordinary skill in the art that the system may be modified from these preferred embodiments without departing from the scope of the present invention.

Experimental Results

1. Cryostat-100 Thermal Performance Testing of LCI-EX Composites

Cryostat thermal performance testing of five layered composite test specimens was performed by the Cryogenics Test Laboratory at the NASA John F. Kennedy Space Center using a Cryostat-100 testing device which is a cylindrical guarded liquid nitrogen ($LN_2$) boiloff calorimeter. Aerogel composite blanket materials (i.e., thermal insulation material) were combined with other radiant barrier layered materials (i.e., compressible barrier material) to produce a thermal insulation system for non-vacuum applications having a multilayered composite insulation system for extreme external environment (LCI-EX); that is, no vacuum jacket nor double-wall containment as part of the overall design application. The main target application is for non-vacuum (ambient pressure) cryogenic piping. The core materials to be used are listed below.

The results are calculated in both heat flux (q) [$W/m^2$] and effective thermal conductivity ($k_e$) [mW/m-K]. The boundary temperatures were approximately 78K and 293K for all tests. The primary objective for cold vacuum pressure (CVP) was the no vacuum (approximately 760 torr) condition. The residual gas was nitrogen for all tests.

Physical characteristics of the test specimens are summarized in Table 1. The following designations apply: R-P (Reflectix® double bubble radiant barrier, standard plastic backed), R-A (Reflectix® double bubble, aluminum backed outer surface), C-5 (Aspen Cryogel® aerogel blanket, 5-mm thick), and C-10 (Aspen Cryogel® aerogel blanket, 10-mm thick).

TABLE 1

Physical Characteristics of Cryostat-100 Test Specimens (Summary)

| Test Series | Description | Thickness (mm) | Circumference (mm) | Mean Area ($m^2$) |
|---|---|---|---|---|
| A161 | R-P (five layers) | 38.5 | 767 | .382 |
| A162 | R-A (five layers) | 35.0 | 743 | .347 |
| A163 | C-5/R-P/C-5/R-P/R-A | 36.0 | 749 | .357 |
| A166 | C-10/R-P/C-10/R-P/R-A | 47.0 | 821 | .466 |

A summary of all Cryostat-100 tests is given in Table 2.

TABLE 2

Summary of thermal performance test results for Cryostat-100 test series.

| Test Series | Description | CVP** (millitorr) | Boiloff Flow Rate (sccm) | Q (W) | $k_e$* (mW/ m-K) | Heat Flux (q)* ($W/m^2$) |
|---|---|---|---|---|---|---|
| A161 | R-P (five layers) | | | | | |
| Test 2 | | 760000 | 17,400 | 72.0 | 35.2 | 189 |
| Test 3 | | 760000 | 16,000 | 66.2 | 32.4 | 173 |
| A162 | R-A (five layers) | | | | | |

TABLE 2-continued

Summary of thermal performance test results for Cryostat-100 test series.

| Test Series | Description | CVP** (millitorr) | Boiloff Flow Rate (sccm) | Q (W) | $k_e$* (mW/ m-K) | Heat Flux (q)* ($W/m^2$) |
|---|---|---|---|---|---|---|
| Test 1 | | 760000 | 13,900 | 57.5 | 28.2 | 166 |
| Test 2 | | 760000 | 14,500 | 60.0 | 29.4 | 173 |
| A163 | C-5/R-P/C-5/R-P/R-A | | | | | |
| Test 2 | | 760000 | 11,900 | 49.2 | 24.1 | 138 |
| Test 4 | | 760000 | 12,800 | 53.0 | 25.9 | 148 |
| A166 | C-10/R-P/C-10/R-P/R-A | | | | | |
| Test 2 | | 760000 | 8,900 | 36.8 | 18.0 | 79.0 |
| Test 3 | | 760000 | 8,800 | 36.4 | 17.8 | 78.1 |
| Test 4 | | 760000 | 9,500 | 39.3 | 19.2 | 84.4 |

*Boundary temperatures are approximately 293K and 78K
**CVP = Cold Vacuum Pressure (residual gas is nitrogen)

2. Thermal Insulation System Installation for a 2,000-Gallon Stainless Steel Cryogenic Tank A cryogenic test facility being developed at the Cryogenics Test Laboratory includes a flight simulator tank that is 2,000 gallons in a vertical configuration with single-wall stainless steel construction. The tank was insulated to provide a stable thermal control situation for the different research tests to be performed. The thermal performance of the tank's thermal insulation system should be generally representative of a flight tank. This tank is approximately 17-feet tall and 5-feet in diameter. The tank is designed for up to 75 psig operating pressure and liquid nitrogen temperature (−321° F.). The 14-feet tall cylindrical side or barrel of the tank is unobstructed and ports are concentrated on the upper and lower domes, each stand 1-foot tall. The total surface area of the tank is approximately 25 $m^2$. The thermal insulation system selected for the tank is one of several designs based on the thermal insulation system of the present invention for non-vacuum, external environment applications (i.e., Layered Composite Insulation-External (LCI-EX) technology). The tank includes a number of appurtenances and is instrumented with temperature sensors and other devices. A design tool incorporating the latest Cryostat-100 thermal conductivity data was used to calculate the thermal performance. The following conditions were applied: 300K and 77K boundary temperatures, in ambient air with no convection effects, and no compensation for heat leaks through piping nozzles. The heat leak comparison for the different configurations is given in Table 3.

TABLE 3

Heat Leak Comparisons of Several Configurations

| System | Description | Heat (W) | Heat Flux ($W/m^2$) | LN2 Boil-off Equivalent (gpm) |
|---|---|---|---|---|
| LCI-EX 5-layer | C10/RP8/C5/RP/C5 | 2,214 | 90 | 0.22 |
| LCI-EX 3-layer | C5/RP/C5 | 5,211 | 212 | 0.52 |
| Frosty | Just frosty layer | 13,617 | 555 | 1.39 |
| Icy | Just ice layer | 50,180 | 1,025 | 5 |
| Shuttle ET LO2 Tank | Spray-On Foam | 100,000 | ~200 | 10 |

The new thermal insulation system for non-vacuum application, which is a 3-layer aerogel-based system, was selected for application to the 2,000 gallon stainless steel tank. This thermal insulation system provides a moderate amount of thermal performance to enable predictable and repeatable control of the system. The heat flux of 200 W/m² is roughly equivalent to about one inch of spray-on foam insulation. A bare tank would not give consistent performance as indicated by the large differences between frost and ice conditions.

The environment is full outdoor exposure (e.g., wind, rain, UV, low-level salt) within 5 miles of the seacoast. All of the thermal insulation systems addressed are of the non-vacuum, external environment type. The 760 torr ambient air is at the prevailing humidity and salinity levels. For lower humidity conditions, the cryogenic temperature of liquid nitrogen can lead to the liquid condensation of air on the cold surfaces. But the main challenge is to minimize the amount of ice and frost in the external, humid environment.

The normal operation modes for both the piping and the tanks are transient (on/off). The process fluid is liquid nitrogen (LN2) at temperatures down to −321° F. and pressures up to 50 psig. A given cold flow operation could extend from a few hours up to perhaps 24 hours. The operations are not steady-state (long-term cold), for 24 hours per day, 7 days a week. The system is for experimental testing and technology development over the course of several years. For life cycle analysis, a period of 7 years is the estimated life needed for the purposes of the facility. The LCI-EX system itself is expected to last many years beyond this requirement with an estimated life of over 20 years.

The objective of the experiment is to provide a reasonable, as well as a consistent level of thermal insulation performance and reduced heat leakage rate (watts) as compared to a bare uninsulated tank. The performance of a bare tank would vary according to frost or hard ice coverage, freeze/thaw cycles, and the weather. The thermal performance will still vary according to time of day, time of year, wind speed, humidity, salinity, rain, and so forth, but the thermal insulation system will provide a much more consistent and stable heat leak result over the course of these natural variations in environment and the type of transient operation being performed. The design of the thermal insulation system is based on eliminating convection where possible and reducing conduction as much as reasonable in consideration of the overall mechanical design structure, i.e., supports, flanges, ports, etc.

The thermal insulation system must be cost-effective, readily installed and/or procured, and look attractive while providing an adequate level of thermal insulation performance. The operation is transient which means that weeks or months long cold soak and storage are not required and that some condensation and frost is tolerable. The LCI-EX system comprised of low thermal conductivity, hydrophobic, impact resistant materials meets this combination of heat leak, life cycle, mechanical, and moisture requirements.

The materials to be used for an example 5-layer piping system for the test facility are listed as follows and the square footage estimates are given in Table 4.
Basic materials: Cryogel® blanket, Reflectix® wrap, VentureClad® overwrap.
Thermal insulation layer: Aerogel composite blanket: Cryogel® or Cryogel®-Z blanket by Aspen Aerogels, 10-mm thickness (C-10) and 5-mm thickness (C-5). Cryogel®-Z type adds the aluminized plastic backing, which is optional.

Compressible barrier layer or radiant barrier: double bubble UV protective aluminized plastic wrap by Reflectix, 5/16" (8-mm) thickness (R-P); double bubble UV protective wrap, aluminized plastic one side, aluminum foil the other side, by Reflectix, 5/16" (8-mm) thickness (R-A).

TABLE 4

Materials list for example piping thermal insulation system.

| Material | Layer | Area (ft²) | Thickness (mm) |
|---|---|---|---|
| Cryogel ®-Z 10-mm (C-10) | 1 | 290 | 10 |
| Reflectix ® (R-P) | 2 | 423 | 8 |
| Cryogel ®-Z 5-mm (C-5) | 3 | 290 | 5 |
| Reflectix ® (R-A) | 4 | 40 | 8 |
| Vinyl Wrap | 5 | 25 | 1 |
| | | Total: | 32 |

The basic thermal insulation system for the example tank for the test facility is a four-layer design consisting of Cryogel®-Z (C-10) on the inner surface followed by metalized plastic Reflectix® (R-P), followed by Cryogel®-Z (C-5), followed by a vinyl wrap for the outer casing. The upper dome of the tank is finished with aluminum foil backed Reflectix® (R-A) as the external wrap for additional weather barrier protection, ruggedness, and smooth appearance. The material designations are outlined in Table 5. The basic design is given in Table 6.

TABLE 5

Material designations for LCI-EX system design for example tank.

| No. | Designation | Description | Vendor | Thickness | Notes |
|---|---|---|---|---|---|
| 1 | C-10 | Cryogel ® x201 | Aspen Aerogels | 10-mm | plain |
| 2 | C-5 | Cryogel ® x201 | Aspen Aerogels | 5-mm | plain |
| 3 | CZ-10 | Cryogel ®-Z | Aspen Aerogels | 10-mm | with backing |
| 4 | CZ-5 | Cryogel ®-Z | Aspen Aerogels | 5-mm | with backing |
| 5 | R-P | Bubble-Plastic | Reflectix | 8-mm | plastic both sides |
| 6 | R-A | Bubble-Aluminum | Reflectix | 8-mm | aluminum both sides |
| 7 | V | 5-mil tape | Ventureclad | 0.5-mm | optional overwrap |
| 8 | T | 2" wide tape | Reflectix | | Aluminum foil tape |
| 9 | W | SST lock wire | | | 0.030" dia. |

TABLE 6

Materials for example tank thermal insulation system.

| Description | Layers | Thickness (mm) | Location |
|---|---|---|---|
| SST Tank | CZ-10 | 10 | inner |
| | R-P | 8 | |
| | CZ-5 | 5 | |
| | Vinyl wrap | 1 | outer |
| | total: | 24 | |

Figure 13:
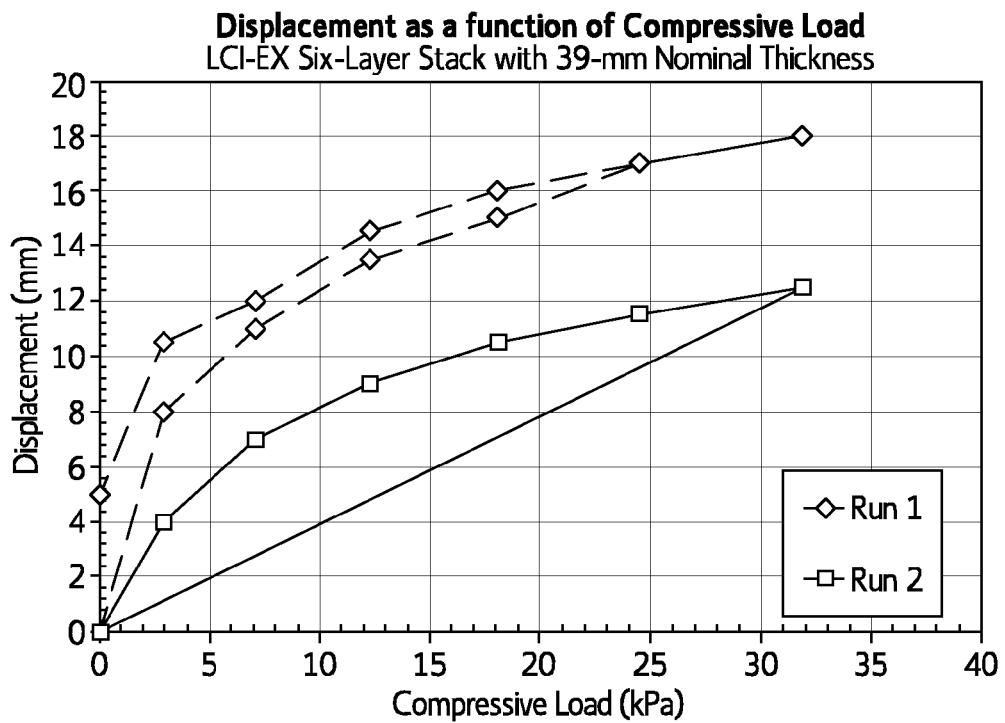
FIG. 13 is a graph showing displacement as a function of Compression Load for the six-layer LCI-EX test article in accordance with one embodiment of the present invention.
Figure 14:
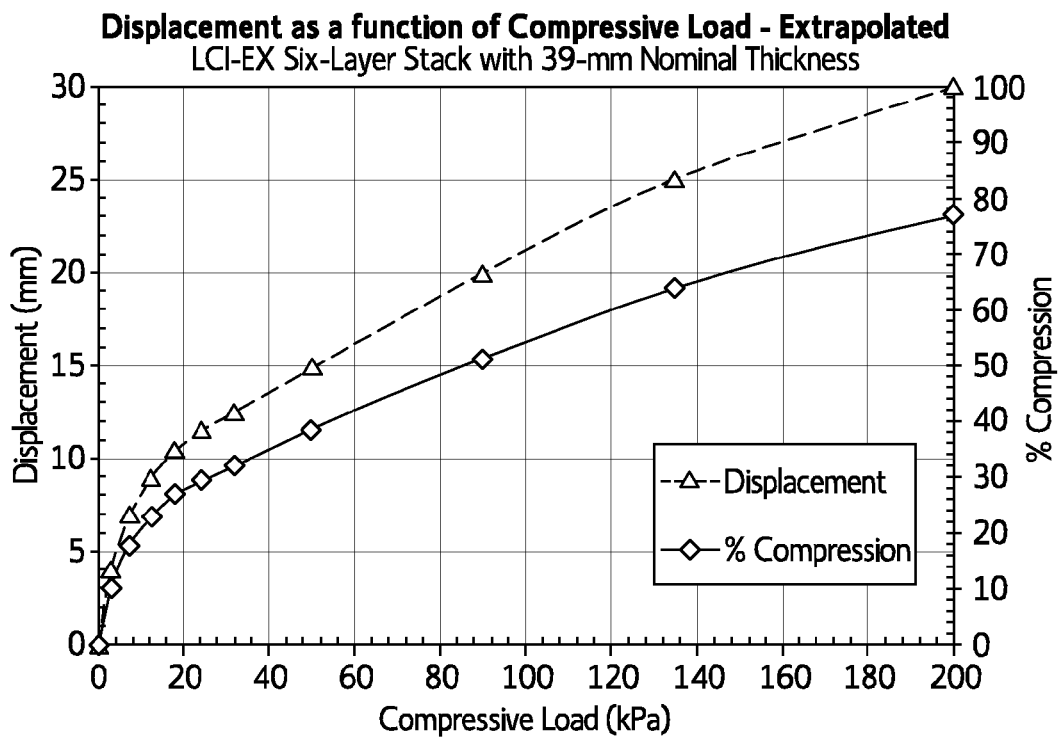
FIG. 14 is a graph showing displacement as a function of Compressive load, extrapolated results, in accordance with one embodiment of the present invention.
Figure 15:
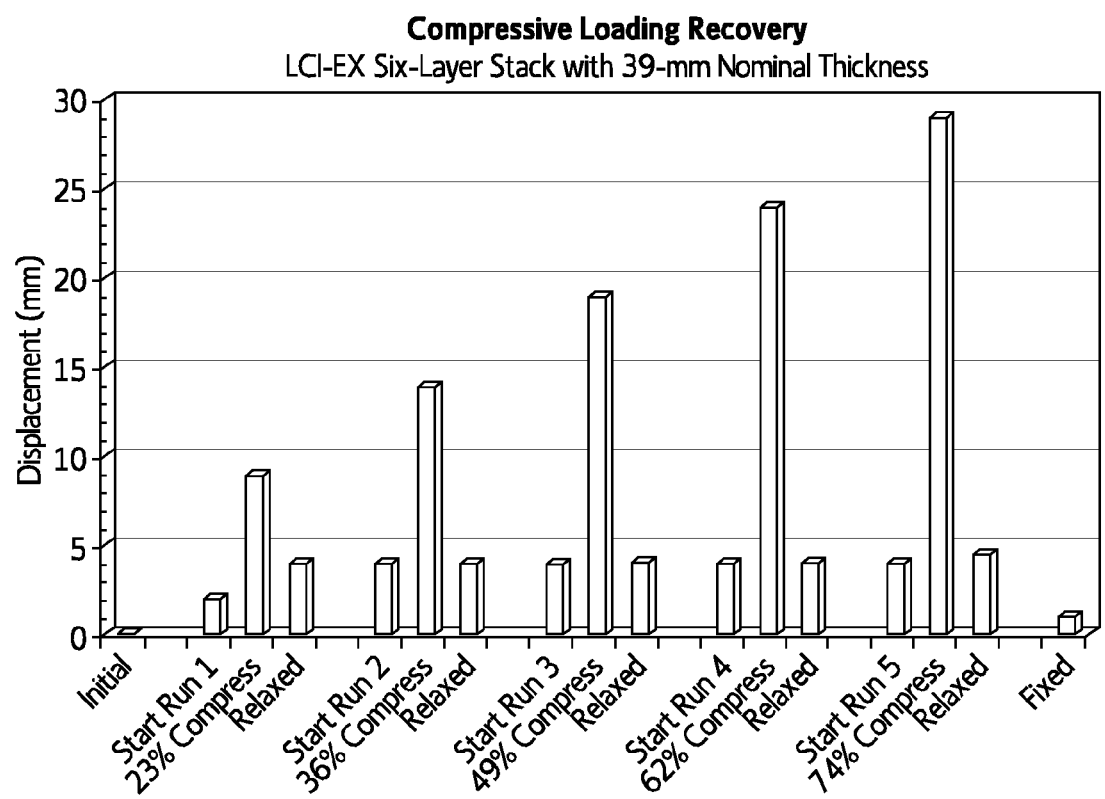
FIG. 15 is a graph showing the results of a Compressive Recovery Test showing complete recovery after more than 74% compression in accordance with one embodiment of the present invention.

The thermal insulation system of the present invention offers good mechanical strength for supporting system loads and offering structural integrity under compressive loads. Mechanical testing of a six-layer LCI-EX system was performed. The 76-mm (3-inch) diameter test article was comprised of the following stack-up of materials: C10, R, C5, RP, C5, RA (top layer) for a total thickness of 49-mm. The settled thickness, and nominal test thickness, was measured to be 39-mm. A test series of Load versus Displacement was performed using a series of known weights for precision. The test data are given in Table 7 and plotted in FIGS. 13 and 14. The six-layer LCI-EX system tested is estimated to withstand compressive mechanical loadings of more than 180 kPa (26 psi) with full elastic recovery. A test series of Compression Recovery was performed using a hydraulic press. The test data are given in Table 8 and plotted in FIG. 15. With a starting thickness of 39 mm (settled), a total of five runs were performed with the following amounts of compression at each run: 9 mm, 14 mm, 19 mm, 24 mm, and 29 mm (74% compression). The specimen was observed to return to the starting thickness of 39 mm. The mechanical tests demonstrate the unique load-supporting, vibration absorbing function of the present invention. The LCI-EX system offers good mechanical strength for supporting system loads and offering structural integrity under compressive loads of more than 100 kPa (15 psi) and up to approximately 180 kPa (26 psi). The LCI-EX system can be substantially compressed to more than 50% of its thickness, and up to approximately 75%, with full elastic recovery when the load is removed.

TABLE 7

Load Displacement Test Data

| | Thickness (mm) | Load (lbf) | Pressure (psi) | Pressure (kPa) | Displacement (mm) | Compression (%) |
|---|---|---|---|---|---|---|
| Run 1 | 44.0 | 0.00 | 0.00 | 0.00 | 0.0 | 0.0 |
| | 36.0 | 3.02 | 0.43 | 2.93 | 8.0 | 18.2 |
| | 33.0 | 7.28 | 1.03 | 7.07 | 11.0 | 25.0 |
| | 30.5 | 12.64 | 1.78 | 12.28 | 13.5 | 30.7 |
| | 29.0 | 18.61 | 2.62 | 18.07 | 15.0 | 34.1 |
| | 27.0 | 25.21 | 3.55 | 24.48 | 17.0 | 38.6 |
| | 26.0 | 32.84 | 4.63 | 31.89 | 18.0 | 40.9 |
| | 27.0 | 25.21 | 3.55 | 24.48 | 17.0 | 38.6 |
| | 28.0 | 18.61 | 2.62 | 18.07 | 16.0 | 36.4 |
| | 29.5 | 12.64 | 1.78 | 12.28 | 14.5 | 33.0 |
| | 32.0 | 7.28 | 1.03 | 7.07 | 12.0 | 27.3 |
| | 33.5 | 3.02 | 0.43 | 2.93 | 10.5 | 23.9 |
| | 39.0 | 0.00 | 0.00 | 0.00 | 5.0 | 11.4 |
| Run 2 | 39.0 | 0.00 | 0.00 | 0.00 | 0.0 | 0.0 |
| | 35.0 | 3.02 | 0.43 | 2.93 | 4.0 | 10.3 |
| | 32.0 | 7.28 | 1.03 | 7.07 | 7.0 | 17.9 |
| | 30.0 | 12.64 | 1.78 | 12.28 | 9.0 | 23.1 |
| | 28.5 | 18.61 | 2.62 | 18.07 | 10.5 | 26.9 |
| | 27.5 | 25.21 | 3.55 | 24.48 | 11.5 | 29.5 |
| | 26.5 | 32.84 | 4.63 | 31.89 | 12.5 | 32.1 |
| | 39.0 | 0.00 | 0.00 | 0.00 | 0.0 | 0.0 |

TABLE 8

Compression Recovery Test Data

| | Thickness (mm) | Loading Step | | Compression (mm) | (%) |
|---|---|---|---|---|---|
| Settle | 39.0 | 0 | | | |
| | 37.0 | 0 | Initial | 0 | |
| Run1 | 37.0 | 0 | Start Run 1 | 2.0 | 5.1 |
| Deflection | 30.0 | 1 | 23% Compress | 9.0 | 23.1 |
| | 35.0 | 0 | Relaxed | 4.0 | 10.3 |
| Run2 | 35.0 | 0 | Start Run 2 | 4.0 | 10.3 |
| Deflection | 25.0 | 2 | 36% Compress | 14.0 | 35.9 |
| | 35.0 | 0 | Relaxed | 4.0 | 10.3 |
| Run3 | 35.0 | 0 | Start Run 3 | 4.0 | 10.3 |
| Deflection | 20.0 | 3 | 49% Compress | 19.0 | 48.7 |
| | 35.0 | 0 | Relaxed | 4.0 | 10.3 |
| Run4 | 35.0 | 0 | Start Run 4 | 4.0 | 10.3 |
| Deflection | 15.0 | 4 | 62% Compress | 24.0 | 61.5 |
| | 35.0 | 0 | Relaxed | 4.0 | 10.3 |
| Run5 | 35.0 | 0 | Start Run 5 | 4.0 | 10.3 |
| Deflection | 10.0 | 5 | 74% Compress | 29.0 | 74.4 |
| | 34.5 | 0 | Relaxed | 4.5 | 11.5 |
| | | | Final | 0 | |

The material technology and related installation and operational methodologies of the layered composite thermal insulation system for non-vacuum, external environment applications (LCI-EX) provide a game-changing approach to the problem of cryogenic insulation in the open ambient environment. Previous technologies include cellular glass, rigid foam, or spray foam. Using only aerogel blankets is a newer technology, but has some practical limitations for certain applications. The LCI-EX thermal insulation system of the present invention solves the problems associated with the previous technology while providing a cost-effective, hybrid approach by incorporating the use of aerogel blankets in practical thermal insulation systems that are breathable and removable, which is a truly unique feature to advance the state of the art in low-temperature process systems.

The LCI-EX system of the present invention provides favorable mechanical and thermal properties in one integrated and layered approach. Low values for effective thermal conductivity are achieved by managing all modes of heat transfer (solid conduction, convection, gas conduction, and radiation) by its combination of materials and method of installation. The thermal performance of the thermal insulation system is maintained through the life-cycle by the hydrophobic properties of the thermal insulation and compressible barrier layers in combination with the built-in moisture draining and venting features of the installed system. Robust mechanical properties are achieved by a tailored combination of materials for both compressibility and flexibility with full elastic recovery. These mechanical properties allow for thermal contraction/expansion, structural support, impact resistance, and vibration tolerance without degradation of the overall thermal insulation effectiveness of the installed system. Normal mechanical supports for process piping and tank can be augmented or substituted by using the LCI-EX system in a dual-functioning mechanical and thermal manner.

Although the present invention has been disclosed in terms of a preferred embodiment, it will be understood that numerous additional modifications and variations could be made thereto without departing from the scope of the invention as defined by the following claims:

I claim:
1. A thermal insulation system for non-vacuum applications, comprising:
 a) a multilayered composite having an inner surface and an outer surface including
  i) at least one thermal insulation layer and at least one compressible barrier layer provided as alternating, successive layers, wherein each thermal insulation layer and compressible barrier layer is conformable to a three-dimensional surface of an article to be insulated, and
  ii) at least one reflective film formed of a material selected from a group consisting of metal foils and metalized foils, wherein said reflective film is provided on at least one surface of said thermal insulation layer, said compressible barrier layer, or both, and
b) an optional outer casing surrounding said outer surface of said multilayered composites; wherein said thermal insulation system is breathable allowing for any accumulated internal water to be naturally drained and released over time according to normal thermal cycling operational processes.

2. The thermal insulation system of claim 1, wherein said at least one compressible barrier layer is directly disposed on said at least one thermal insulation layer.

3. The thermal insulation system of claim 1, wherein said multilayered composite includes a plurality of thermal insulation layers provided in a successive, alternating pattern with a plurality of compressible barrier layers such that said thermal insulation layers and said compressible barrier layers are directly disposed upon each other without any intervening layers other than said reflective film.

4. The thermal insulation system of claim 1, wherein said inner surface of the multilayered composite is composed of at least one thermal insulation layer.

5. The thermal insulation system of claim 1, wherein the number of thermal insulating layers is from 1 to 10.

6. The thermal insulation system of claim 1, wherein said thermal insulation layer includes an aerogel composite blanket.

7. The thermal insulation system of claim 1, wherein said thermal insulation layer is hydrophobic.

8. The thermal insulation system of claim 1, wherein said compressible barrier layer includes a flexible polymeric sealed air material.

9. The thermal insulation system of claim 1, wherein said compressible barrier layer is water-proof.

10. The thermal insulation system of claim 1, wherein said outer surface includes an outer compressible barrier layer having said reflective films directly disposed on at least one outer surface of said outer compressible barrier layer.

11. The thermal insulation system of claim 1, wherein said outer surface includes an outer insulation layer having said reflective film directly disposed on at least one outer surface of said outer thermal insulation layer.

12. The thermal insulation system of claim 1, wherein each of said compressible barrier layers has an inner surface and an outer surface each provided as a reflective film.

13. The thermal insulation system of claim 1, wherein said thermal insulation system withstands mechanical impact or shock and is compressible to more than 50% of its thickness with full elastic recovery.

14. The thermal insulation system of claim 1, wherein said thermal insulation system withstands mechanical impact or shock and supports compressive loads of more than 15 psi with full elastic recovery if the load is removed.

15. The thermal insulation system of claim 1, wherein said optional outer casing is a breathable medium having a sufficiently low pore size to permit venting of gases and moisture from within the outer casing.

16. The thermal insulation system of claim 1, wherein said optional outer casing is an impermeable medium including cut slits or holes to permit venting of gases and moisture from within the optional outer casing.

17. The thermal insulation system of claim 1, wherein said thermal insulation system is externally applied to process piping or tanks for cold or hot applications.

18. The thermal insulation system of claim 1, wherein said multilayered composite is provided as a layer pair including only one thermal insulation layer directly disposed on only one compressible barrier layer.

19. The thermal insulation system of claim 1, wherein said thermal insulation system has an effective thermal conductivity in air of 10-50 mW/m-K.

20. The thermal insulation system of claim 19, wherein said thermal insulation system has an effective thermal conductivity in air of 18-25 mW/m-K under ambient temperature conditions.

21. The thermal insulation system of claim 1, wherein said thermal insulation system is externally applied to process piping components for cold or hot applications.

22. The thermal insulation system of claim 21, wherein said process piping components include components selected from the group consisting of valves, flanges, supports, and expansion joints.

23. The thermal insulation system of claim 1, wherein said thermal insulation system is provided as a removable insulation cover for process piping components for cold or hot applications.

24. The thermal insulation system of claim 23, wherein said process piping components include components selected from the group consisting of valves, flanges, supports, and expansion joints.

25. A construction system comprising at least one large panel formed from said thermal insulation system of claim 1, wherein said large flat panel is 4-10 feet long.

26. An insulated shipping container having a plurality of walls, wherein said plurality of walls are formed using said thermal insulation system of claim 25.

27. A method for insulating without the use of vacuum, an article having an outer surface comprising,
  providing the multilayered composite of claim 1 such that said at least one thermal insulation layer is directly disposed against the outer surface of the article.

28. The method of claim 27, wherein said at least one compressible barrier layer is directly disposed on said at least one thermal insulation layer.

29. The method of claim 27, wherein said multilayered composite includes a plurality of thermal insulation layers provided in a successive, alternating pattern with a plurality of compressible barrier layers such that said thermal insulation layers and said compressible barrier layers are directly disposed upon each other without any intervening layers other than said reflective film.

30. The method of claim 27, wherein the number of thermal insulating layers is from 1 to 10.

31. The method of claim 27, wherein said thermal insulation layer includes an aerogel blanket.

32. The method of claim 27, wherein said compressible barrier layer includes a flexible polymeric sealed air material.

33. The method of claim 27, wherein said article is process piping or tanks for cold or hot applications.

34. The method of claim 27, wherein said multilayered composite is provided as a layer pair including only one thermal insulation layer directly disposed on only one compressible barrier layer.

35. The method of claim 27, wherein said article is a piping component for cold or hot applications.

36. The method of claim 35, wherein said piping components is selected from the components consisting of valves, flanges, supports, and expansion joints.

37. The method of claim 27, wherein said multilayered composite is removable for the application to process piping components for cold or hot application.

38. The method of claim 37, wherein said process piping components are selected from the components consisting of valves, flanges, supports and expansion joints.

39. A method for insulation comprising providing said construction system of claim 25.

40. A method for insulation comprising providing said insulated shipping container of claim 26.

* * * * *